United States Patent [19]

Vishnitsky

[11] Patent Number: 5,004,529
[45] Date of Patent: Apr. 2, 1991

[54] ELECTROCHEMICAL ETCHING APPARATUS
[75] Inventor: Alexander Vishnitsky, Henrietta, N.Y.
[73] Assignee: Robert Bosch GmbH, Stuttgart, Fed. Rep. of Germany
[21] Appl. No.: 423,766
[22] Filed: Oct. 18, 1989
[51] Int. Cl.$^5$ .................. B23H 9/00; B23H 3/04
[52] U.S. Cl. .................. 204/212; 204/224 M; 204/272
[58] Field of Search .................. 204/212, 225, 272
[56] References Cited
U.S. PATENT DOCUMENTS
3,769,194 10/1973 Haggerty .................. 204/212 X
4,690,737 9/1987 Vishnitsky .................. 204/212 X Primary Examiner—Donald R. Valentine
Attorney, Agent, or Firm—Cumpston & Shaw

[57] ABSTRACT

An electrode for an electrochemical etching machine includes first and second coaxial control rods, first and second disks attached to the first and second control rods respectively, the disks axially aligned and independently rotatable by the control rods. The electrode includes at least one additional disk disposed between the first and second disks, and axially aligned therewith together with an aligning rod coupled between the first and second disks for controlling the rotation of the further disk to align it to a position intermediate the position of the first and second disks.

9 Claims, 4 Drawing Sheets

ELECTROCHEMICAL ETCHING APPARATUS

This invention relates in general to apparatus for electrochemical rifling and more particularly to a cathode for rifling grooves in a gun barrel.

U.S. Pat. No. 4,690,737 describes apparatus for electrochemical rifling of gun barrels. The apparatus described in the patent represents a significant advance over the prior art, and allows rifled gun barrels and particularly rifled gun barrels having gain twist rifling to be produced more efficiently than was previously possible.

Gain twist rifling, that is rifling in which the pitch of the rifling grooves increases from the breech to the muzzle of the gun barrel is increasingly important for barrels used in guns that fire high velocity rounds. For example, it is desirable to produce rifling grooves that have a pitch which increases smoothly from about one turn per hundred inches at the breech end, to one turn per twelve inches at the muzzle end.

Short gun barrels may be easily fabricated using the apparatus and methods described in the earlier patent, through the use of a stationary cathode having the desired twist gain built into the pattern of electrodes and insulators of the cathode. As described in the earlier patent, gain twist may be rifled into longer barrels by moving a plurality of annular metallic cathode segments along a cam rod axially aligned within the barrel. Pins on the cathode segments track a groove in the rod to cut gain twist rifling grooves in the barrel. While the foregoing method and apparatus have proven effective, they are difficult to use in fabricating long, small bore gun barrels. For example, there is a need for 20 mm gun barrels having lengths of 6–10 feet or more for use in aircraft cannon. It is difficult to accurately fabricate a cam rod to provide gain twist rifling in such long, small bore barrels. The cam rod would need to be 10 mm in diameter or less, and would need to have excellent torsional stability to accurately rifle the desired gain twist grooves.

It is another disadvantage of the known apparatus that a different cathode rod must be provided for each groove pattern, that is each change in the pitch or acceleration to be rifled in the gun barrel. Further, as the cathode rods are used repeatedly in rifling a number of gun barrels, the pins in the rifling segments and the grooves in the cathode rods will wear and the rods and the segments will need to be replaced. Each time the size of the gun barrel or the rifling characteristics are changed, the rifling machinery must be at least partially torn down, and a new rod installed. Since the cathode rods extend all the way through the barrels and must be supported at both ends, some disassembly is required to remove each rifled gun barrel and instal an unrifled barrel for processing.

It is an object of this invention to provide an improved electrode for an electrochemical rifling machine that overcomes many of the disadvantages of known electrodes.

Briefly stated, in accordance with one aspect of this invention, an electrode for an electrochemical rifling machine includes first and second coaxial control rods, first and second disks attached to the first and second control rods respectively, the disks axially aligned and independently rotatable by the control rods.

In accordance with another aspect of this invention, the electrode further includes at least one additional disk disposed between the first and second disks, and axially aligned therewith together with means coupled between the first and second disks for controlling the rotation of the further disk to align it to a position intermediate the position of the first and second disks.

The novel aspects of this invention are defined with particularity in the appended claims. The invention itself, together with further objects and advantages thereof may be more readily understood by reference to the following detailed description of the invention, taken in conjunction with the accompanying drawings, in which:

Figure 1:
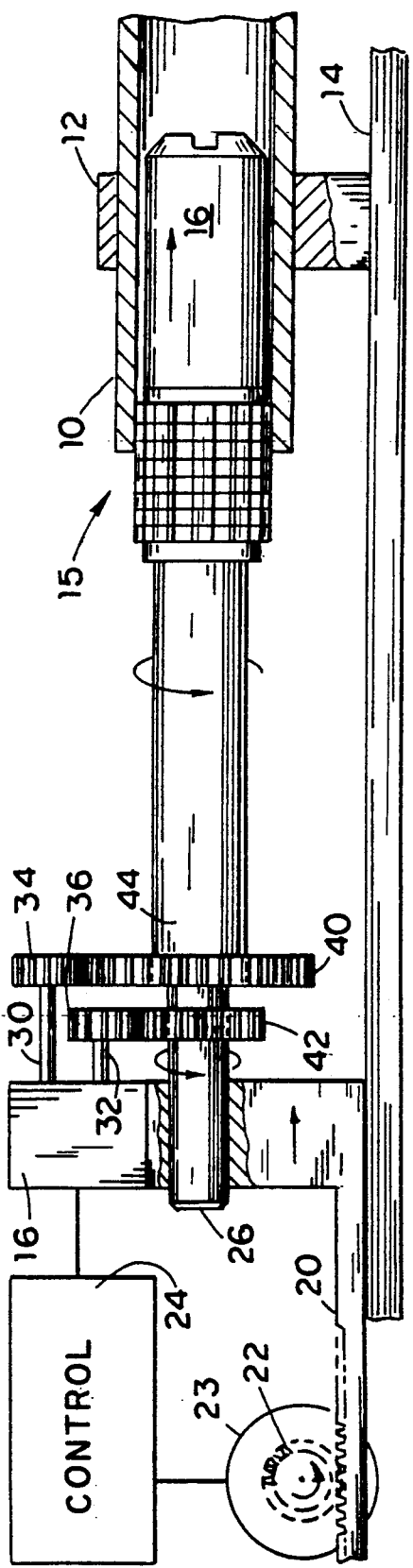
FIG. 1 is a side elevation, partly in section, of a simplified rifling machine for using a cathode in accordance with this invention.
Figure 2:
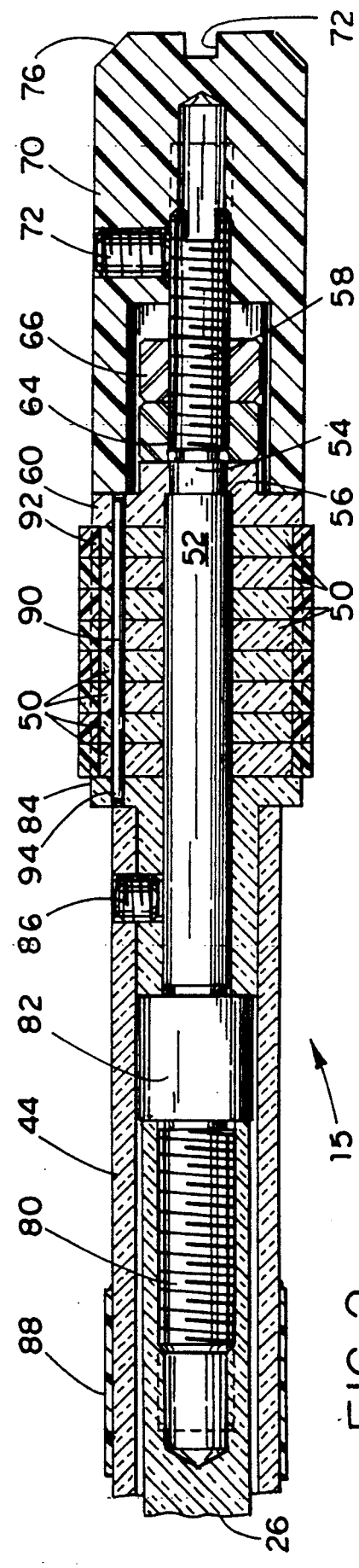
FIG. 2 is a section of a flexible cathode in accordance with this invention.

Turning now to FIG. 1, a simplified side elevation of a rifling machine utilizing a cathode in accordance with this invention is illustrated. Those skilled in the art will immediately recognize that the electrical power supplies and the portions of the rifling machine required for providing a flow of electrolyte have been omitted from the simplified apparatus of FIG. 1. A more complete electrochemical rifling machine is shown and described in U.S. Pat. No. 4,690,737, the contents of which are incorporated herein by reference.

A gun barrel 10 to be rifled is held firmly in place by one or more upright supports 12 mounted on a rifling machine base 14. Preferably, support 12 is electrically connected to barrel 10 or other means are provided for making electrical connection from gun barrel 10 to a suitable power supply (not shown). Twist cathode 15 is mounted for reciprocal longitudinal movement in and out of gun barrel 10, and for rotation in head block 16, which is slidably mounted on base 14. The twist cathode is driven through the gun barrel by any conventional arrangement, such as rack 20 and pinion 22, which may be controlled in open or closed loop fashion by motor 23 and controller 24. An end of shaft 26 of twist cathode 16 is journaled for rotation in head block 16 by any suitable bearing arrangement. First and second twist motors (not shown) have shafts 30 and 32, with gears 34 and 36, mounted on the ends thereof, for engaging coaxially aligned gears 40 and 42 mounted on the ends of rod 26 and sleeve 44 respectively. Motor shafts 30 and 32, and the rotation of sleeve 44 and shaft 26 are independently controlled by controller 24. The rotation of the shafts and the rifling disk may be synchronized to form any desired gain twist rifling in gun barrel 10, as will be more completely described below. Preferably, an electrical connection (not shown) is made to rod 26 through head block 16 in a conventional fashion.

The structure of a twist cathode 15 in accordance with this invention is illustrated in more detail in FIGS. 2 through 9. A plurality of rifling disks 50 is journaled on an elongated inner shaft 52. Shaft 52 includes a necked down portion 54 of smaller diameter than the main portion of shaft 52 and terminating in a shoulder 56 and leading to a threaded end portion 58. A first collar 60 is securely fastened on necked down portion 54 by nuts 64 and 66 threaded on region 58 in locking configuration. Collar 60 is thereby firmly held in engagement with shoulder 56, so that it rotates with shaft 52. Preferably, an insulating end cap 70 having a blind bore formed therein with a threaded portion for engaging threaded shaft portion end 58 and a larger diameter region for clearing nuts 64 and 66 is mounted to collar 60 and secured by conventional means, such as a set screw 72. Preferably, insulator 70 has a screw driver notch 72 for allowing it to be firmly threaded onto shaft 58, and has a tapered end portion 76 for improving the flow of electrolyte during rifling.

The opposite end of rod 52 includes a threaded portion 80 for receiving the end of coupling shaft 26. An enlarged bearing portion 82 engages the inner surface of independently rotatable sleeve 44. Sleeve 44 is attached to a second collar 84 by conventional means such as a set screw 86. Preferably, a layer of insulating material 88 is applied to the outer surface of sleeve 44 to inhibit electrolytic action between the sleeve, the electrolyte and the inside of the gun barrel during the rifling operation.

The twist cathode shown and described above provides for independent rotation of collars 60 and 84 around a central axis of rotation to position rifling disks 50 for etching rifling grooves in barrel 10 in any desired configuration including especially a gain twist configuration. A resilient rod 90 extends between bores 92 and 94 respectively, formed in collars 60 and 84, and passes through each of a plurality of axially aligned rifling disks 50. Rod 90 is slidably mounted in at least one of bores 92 and 94 of collars 60 and 84, and slidably engages each of the rifling disks 50.

Figure 3:
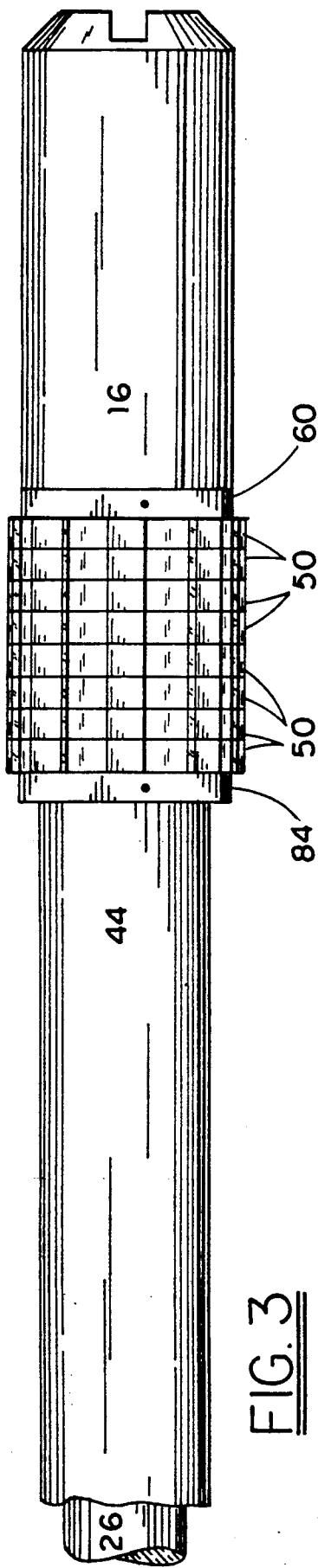
FIG. 3 is a side elevation of the flexible cathode of FIG. 2 showing the rifling disks in an aligned configuration.
Figure 5:
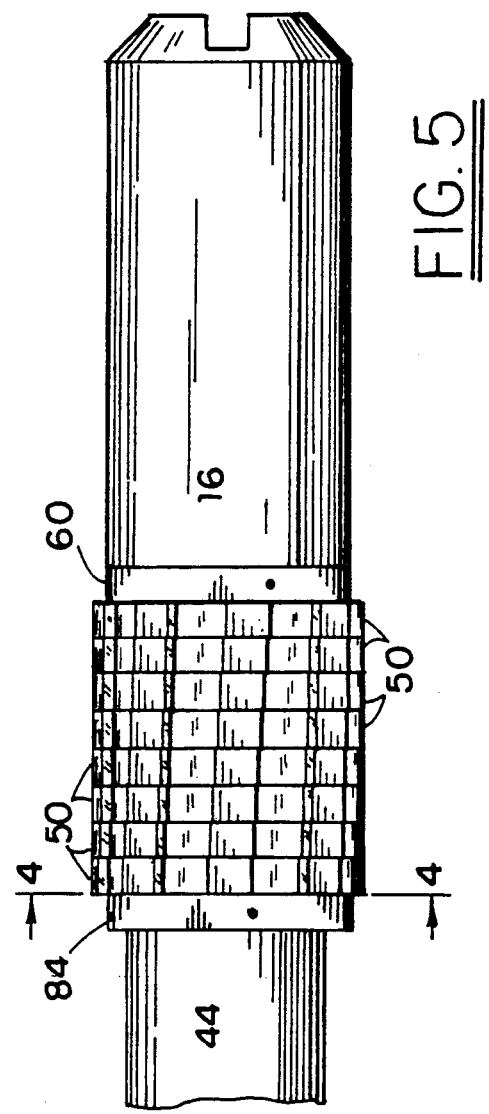
FIG. 5 is a segmental side elevation of a flexible cathode of the invention showing the rifling disks in an operating configuration.
Figure 4:
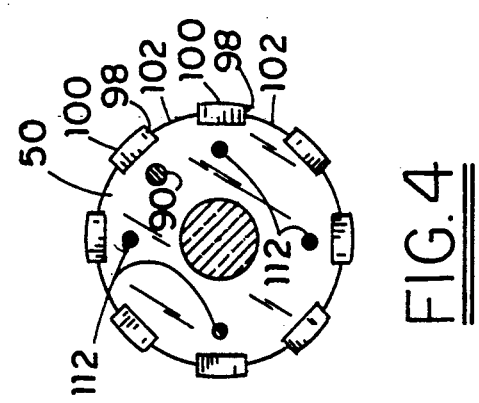
FIG. 4 is a cross-section taken along lines 4—4 of FIG. 5.

FIGS. 3 and 5 show twist cathode 16 in an untwisted (FIG. 3) and twisted (FIG. 5) configuration respectively. Each of the rifling disks 50, as most clearly seen in FIG. 4, includes a plurality of circumferentially spaced apart notches 98 into each of which is fixed an insulator 100. The electrochemically active portions of the rifling disk 50 are the exposed surface portions 102 arranged radially spaced apart between the insulators 100. During rifling, electrolyte flows in the spaces between the surfaces of the active portions 102 and the inside surface of gun barrel 10, for carrying out the electrochemical rifling action, as current flows from the disks to the gun barrel. By independently rotating collars 60 and 84 from an aligned position as shown in FIG. 3 to an offset position as shown in FIG. 5, by relative motion of rod 76 and sleeve 44 the rifling disks 50 are aligned in a twist configuration. By varying the relative angular positions of the collars 60 and 84 while the twist cathode 16 is passing longitudinally through gun barrel 10, the pitch of the twist may be varied along the length of the barrel, thereby allowing gain twist rifling to be etched in the barrel.

Figure 6:
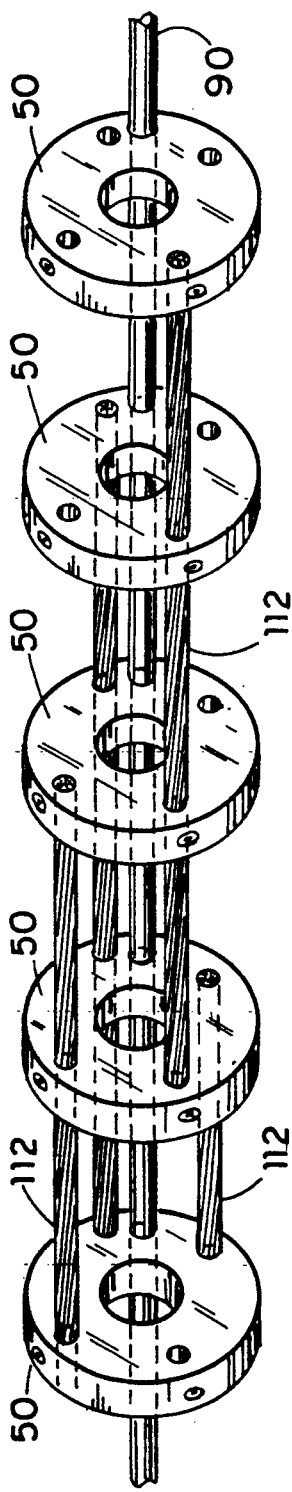
FIG. 6 is a fragmentary exploded slightly simplified view of a plurality of rifling disks showing the mechanical and electrical interconnections therebetween.

The required electrical and mechanical connections between rifling disks 50 may be most readily appreciated by referring now to FIG. 6. A plurality of simplified disks 50 is shown in which the notches 98 and insulators 100 have been omitted for simplicity. Resilient rod 90 passes through chamfered bores (see FIG. 8) 110 in each of the disks. The chamfered bore 110 allows the aligning rod 90 to assume an angular orientation as it passes through each of the disks, as will occur in the twist orientation as seen in FIG. 5.

Figure 9:
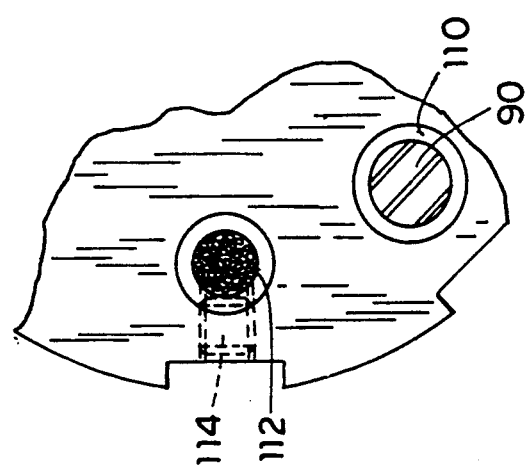
FIG. 9 is a fragmentary front elevation of the portion of the rifling disk shown in FIG. 8.
Figure 8:
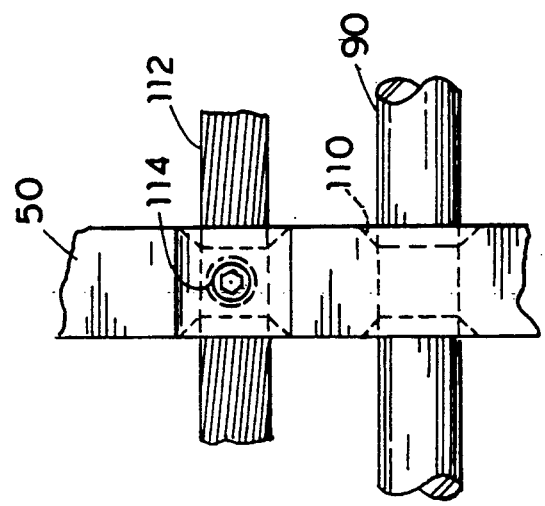
FIG. 8 is a fragmentary view of a rifling disk in accordance with this invention showing the mechanical and electrical connections thereto.
Figure 7:
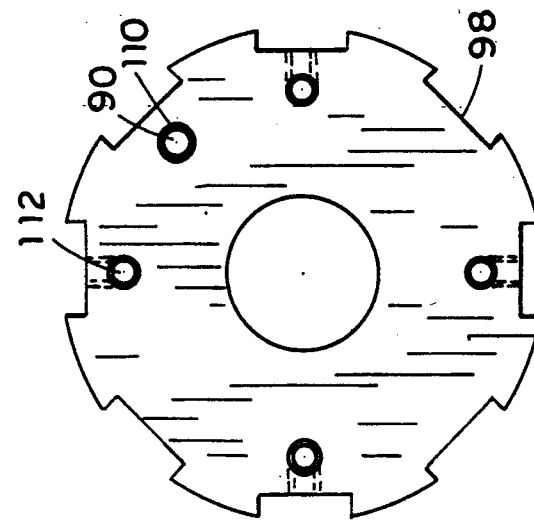
FIG. 7 is a front elevation of a rifling disk in accordance with this invention with the insulator portions removed.

A plurality of low electrical resistance, preferably dead limp conducting cables 112 provides electrical connection among the rifling disks 50 and collars 60 and 84 to rod 26 and or sleeve 44. Preferably, at least one of the cables is attached in a low resistance fashion to each of the disks by set screws 114, as may be readily seen in FIGS. 8 and 9. It is preferred that cables 112 be arranged so as to interfere as little as possible with the rotation of the disks 50 by wire 90. To this end, it is preferred that connection be made only between spaced apart disks with the cable passing freely through openings in intermediate disks, with the appropriate set screws omitted therefrom. Even more preferably, the cables 112 may pass unattached through several intermediate disks. Contact to the intermediate disks is made by others of cables 112 in a manner that may be readily appreciated by reference to FIG. 6. Still further, it is preferable if cables 112 are at least slightly longer than is necessary to extend between the rifling disks in their aligned configuration, so that when moved to the twist configuration, the cables will not be tensioned so as to resist twist. To this end, it is preferred that the holes in disks 50 through which cable 112 passes are also chamfered as seen in FIGS. 8 and 9.

In operation to rotatably pass cathode 15 through a gun barrel to etch gain twist rifling grooves therein, controller 24 is arranged to rotate rod 26 and collar 60 so as to drive the leading rifling disk through the barrel, so as to etch the desired gain twist rifling grooves. The following disks are aligned to track the path of the leading disk by rotating collar 84 at a different speed, so as to follow the leading disk. That is, leading disk 92 will be accelerated to etch high gain grooves, while the following disks lag slightly, so as follow the incrementally lower gain grooves and then accelerate to follow the leading disk.

Figure 10:
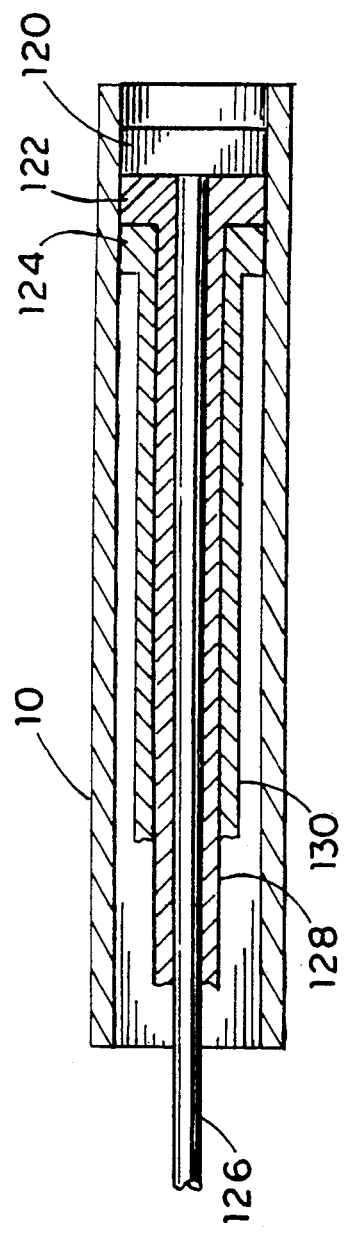
FIG. 10 is a section view of an alternative embodiment of the invention.

While the invention has been described in connection with a presently preferred embodiment thereof, those skilled in the art will recognize that many changes and modifications may be made therein without departing from the true spirit and scope of the invention. For example, an alternative embodiment of the invention is shown in FIG. 10, in which first, second and third rifling disks 120, 122 and 124 are each independently and directly controlled by a central shaft 126, and concentric sleeves 128 and 130 rotatably mounted thereon. While the structure of FIG. 10 may actually be simpler than the embodiment described in connection with FIGS. 1 to 9 for a three disk electrode, it clearly becomes more complex and more difficult to control when a multiplicity of electrodes is desired. A large number of disks permits a greater current flow and higher speed etching.

Accordingly, the scope of the invention is intended to be limied solely by the appended claims.

What is claimed is:

1. Electrochemical etching apparatus comprising:
first control means;
second control means;
first and second spaced apart axially aligned relatively rotatable positioning means coupled to said first and second control means respectively, and adapted for independent rotational movement;
rotatable electrode means disposed between said first and second positioning means; and
means extending between said first and second positioning means for aligning said electrode means to a position intermediate the positions of the first and second positioning means.

2. The electrode of claim 1 wherein said apparatus means comprises a plurality of axially aligned independently rotatable disks.

3. The apparatus of claim 2 comprising an elongated resilient member extending between said first and second positioning means, through said disks.

4. The apparatus of claim 1 further comprising first drive means for rotating said first positioning means at a first angular velocity and second drive means for rotating said second positioning means at a second angular velocity.

5. The apparatus of claim 1 further comprising means for electrically connecting said electrode means to at least one of said first and second positioning means.

6. The apparatus of claim 2 further comprising means for electrically connecting said plurality of disks to at least one of said first and second positioning means.

7. The apparatus of claim 1 wherein said first and second control means comprise a rod and a coaxial sleeve respectively.

8. The apparatus of claim 2 wherein each of said disks comprises a plurality of spaced apart insulators.

9. An apparatus for electrochemically rifling a gun barrel, comprising:
a plurality of axially aligned rifling disks; and
first control means coupled to a first one of said disks for controlling the angular position of said first disk; and
second control means coaxial with said first control means coupled to a second one of said plurality of disks for independently controlling the angular position of said second disk.

* * * * *